United States Patent
Fujita et al.

(10) Patent No.: US 8,155,235 B2
(45) Date of Patent: Apr. 10, 2012

(54) MODULATION DEVICE AND DEMODULATION DEVICE

(75) Inventors: Suguru Fujita, Tokyo (JP); Lei Huang, Singapore (SG); Ping Luo, Singapore (SG)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/524,678

(22) PCT Filed: Jan. 30, 2008

(86) PCT No.: PCT/JP2008/051436
§ 371 (c)(1),
(2), (4) Date: Jul. 27, 2009

(87) PCT Pub. No.: WO2008/093743
PCT Pub. Date: Aug. 7, 2008

(65) Prior Publication Data
US 2010/0086081 A1 Apr. 8, 2010

(30) Foreign Application Priority Data

Jan. 30, 2007 (JP) ................... 2007-020159
Jan. 30, 2008 (JP) ................... 2008-019614

(51) Int. Cl.
*H03K 7/06* (2006.01)
(52) U.S. Cl. ........ 375/271; 375/259; 375/316; 375/295; 375/296; 375/297; 455/126
(58) Field of Classification Search .................. 375/271, 375/259, 316, 295, 296, 297, 345; 455/114, 455/115, 126, 127
See application file for complete search history.

(56) References Cited

U.S. PATENT DOCUMENTS

| 7,120,202 | B2 | 10/2006 | Sasabata | |
|---|---|---|---|---|
| 2003/0119474 | A1* | 6/2003 | Kimura | 455/333 |
| 2003/0147475 | A1 | 8/2003 | Sasabata | |
| 2003/0157888 | A1 | 8/2003 | Inoue | |
| 2003/0181187 | A1* | 9/2003 | Liu | 455/302 |
| 2004/0207478 | A1* | 10/2004 | Gumm | 332/103 |
| 2005/0063487 | A1* | 3/2005 | Sayegh | 375/316 |
| 2007/0104291 | A1* | 5/2007 | Yoon | 375/324 |

FOREIGN PATENT DOCUMENTS

| JP | 2002-281098 | 9/2002 |
|---|---|---|
| JP | 2004-147052 | 5/2004 |
| JP | 2004-200930 | 7/2004 |

OTHER PUBLICATIONS

International Search Report dated Apr. 1, 2008.

* cited by examiner

*Primary Examiner* — David C. Payne
*Assistant Examiner* — Zewdu Kassa
(74) *Attorney, Agent, or Firm* — Dickinson Wright PLLC

(57) ABSTRACT

Provided is a modulation device which generates a phase modulation signal and an amplitude modulation signal and can correct an I/Q orthogonal shift and reduce degradation of the ON/OFF ratio. In the device, a phase shifter (174) controls voltage applied to a capacitor in accordance with a control signal outputted from a phase control unit (180) and adjusts the capacitance so as to shift the phase of a carrier generated by an oscillator (173). The phase control unit (180) estimates a phase shift of a phase shifter (174) in accordance with an output RF signal (S140) by using the phase shift estimation method. Furthermore, the phase control unit (180) performs tuning of the phase shifter (174) according to the estimated value of the phase shift of the phase shifter (174) so that a phase difference between carries of an I signal (S125) and a Q signal (S135) is 90 degrees.

5 Claims, 7 Drawing Sheets

MODULATION DEVICE AND DEMODULATION DEVICE

TECHNICAL FIELD

The present invention relates to a modulation apparatus and demodulation apparatus that use phase modulation signals and amplitude modulation signals and that are applied to, for example, millimeter wavebands.

BACKGROUND ART

In IEEE802.15 Task Group 3c, studies are underway for the physical layer of a high-rate wireless personal area network ("WPAN") using millimeter wavebands around the 60 GHz band. Examples of an application applied the millimeter-wave WPAN are data transfer at a very high data rate over 2 Gbps such as high speed internet access, video streaming (e.g., video on demand, HDTV meaning high definition television, and home theater), and wireless data bus instead of a cable.

Various modulation schemes are considered such as BPSK, QPSK, OOK and OFDM for utilizing the millimeter-wave WPAN. In millimeter-wave utilization by a portable device such as kiosk file downloading, the device is preferable which has a small circuit scale and which adopts a single carrier communication scheme such as BPSK, QPSK and OOK that are suitable for low power consumption and low cost. Therefore, the kiosk side apparatus needs to be realized such that the apparatus can communicate with a portable device in phase modulation scheme such as BPSK and QPSK, and a portable device in amplitude modulation scheme such as OOK.

FIG. 1 is a block diagram showing the main components of QPSK/OOK modulation apparatus 10 according to the first prior art (see Patent Document 1 and Patent Document 2). As shown in FIG. 1, QPSK/OOK modulation apparatus 10 is provided with: OOK data generating section 12 for generating OOK transmission data; QPSK data generating section 13 for generating QPSK transmission data; two pulse shaping sections 14-1 and 14-2 for shaping pulse waveforms of OOK or QPSK data to meet spectral mask; two low pass filters ("LPFs") 16-1 and 16-2 for removing harmonic components from OOK or QPSK data having passed through pulse shaping sections 14-1 and 14-2; filter property switching section 15 for switching between the filter properties of pulse shaping sections 14-1 and 14-2 in association with OOK data or QPSK data; QPSK modulating section 17 for performing QPSK modulation for OOK data or QPSK data from LPFs 16-1 and 16-2; and a modulation selecting section 11 for controlling OOK data generating section 12, QPSK data generating section 13 and filter property switching section 15 according to modulation indication signal S11.

QPSK modulating section 17 is provided with two mixers 17-1 and 17-2 connected respectively to the outputs of LPF's 16-1 and 16-2, and summer 17-5 for adding signals outputted from mixers 17-1 and 17-2. Mixer 17-1 is directly connected to a carrier wave generated by oscillator 17-3, while mixer 17-2 is indirectly connected to a carrier wave via 90-degree phase sifter 17-4.

In FIG. 1, when modulation indication signal S11 indicates the OOK modulation, modulation selecting section 11 activates OOK data generating section 12 and deactivates QPSK data generating section 13. Modulation selecting section 11 also commands filter property switching section 15 to switch the filter properties of pulse shaping sections 14-1 and 14-2 for OOK data.

OOK data generating section 12 outputs 40 signal S12 and Q(t) signal S13, which are represented by equations 1 and 2.

(Equation 1)
$$I(t)=\alpha D(t) \quad [1]$$

(Equation 2)
$$Q(t)=0 \quad [2]$$

Here, $\alpha$ is a constant, and D(t) is an input data signal taking one of a "0" value and a "1" value. Output RF signal S14 of QPSK/OOK modulation apparatus 10 is represented as shown in equation 3.

(Equation 3)
$$\begin{aligned}S(t) &= I(t)\sin\omega t + Q(t)\cos\omega t \\ &= \alpha D(t)\sin\omega t\end{aligned} \quad [3]$$

As known from equation 3, output RF signal S14 is in the form of an OOK modulation wave.

FIG. 2 is a block diagram showing the main components of QPSK/OOK modulation apparatus 20 according to the second prior art (see Patent Document 1 and Patent Document 3). Unlike QPSK/OOK modulation apparatus 10 shown in FIG. 1, QPSK/OOK modulation apparatus 20 employs a configuration eliminating filter property switching section 15 and adding amplitude modulating section 28 for amplifying output signal S24 of QPSK modulating section 26. Further, QPSK/OOK modulation apparatus 20 adopts a different method of generating an OOK modulation wave.

In FIG. 2, when modulation indication signal 21 indicates OOK modulation, as generally well known, OOK data generating section 22 outputs I(t) signal S22 and Q(t) signal S23, which are represented by equations 4 and 5.

(Equation 4)
$$I(t)=\cos\phi D(t) \quad [4]$$

(Equation 5)
$$Q(t)=\sin\phi D(t) \quad [5]$$

Here, $\phi$ is a constant (e.g. 45 degrees). As shown in equations 4 and 5, methods of generating a 90-degree phase difference signal include assigning a phase difference to an IF (Intermediate Frequency) signal generated using a local oscillator of lower frequencies than radio frequencies, adjusting a phase by varying the generation timing of rectangular waves, and so on. Further, note that I(t) signal S22 and Q(t) signal S23 represented by equations 4 and 5 differ from I(t) signal S12 and Q(t) signal S13 represented by equations 1 and 2. Based on equations 4 and 5, output signal S24 of QPSK/OOK modulation apparatus 20 is represented by equation 6.

(Equation 6)
$$\begin{aligned}S(t) &= \alpha(I(t)\sin\omega t + Q(t)\cos\omega t) \\ &= \alpha D(t)\sin(\omega t + \phi)\end{aligned} \quad [6]$$

As known from equation 6, output RF signal S24 is also in the form of an OOK modulation wave.

QPSK/OOK modulation apparatus 20 shown in FIG. 2 has an advantage over QPSK/OOK modulation apparatus 10 shown in FIG. 1 in terms of operational stability. This is because QPSK/OOK modulation apparatus 20 utilizes both I (i.e. in-phase component) and Q (i.e. quadrature component) branches to implement OOK modulation, both I and Q branches operate in synchronization with each other so that variations in the ground levels or the like are corrected or cancelled out with each other, and amplitude modulating section 28 performs amplitude modulation. However, a disadvantage of QPSK/OOK modulation apparatus 20 is that it additionally requires amplitude modulating section 28, resulting in increased implementation complexity.

Patent Document 1: U.S. Patent Application Laid-Open No. 2003-157888, specification Patent Document 2: Japanese Patent Application Laid-Open No. 2004-147052

Patent Document 3: U.S. Patent Application No. 7120202, specification

DISCLOSURE OF INVENTION

Problem to be Solved by the Invention

However, both QPSK/OOK modulation apparatus 10 shown in FIG. 1 and QPSK/OOK modulation apparatus 20 shown in FIG. 2 do not take into account the detrimental effects of phase offsets in 90-degree phase shifters 17-4 and 26-4 for the QPSK/OOK modulation apparatuses. Further, a phase offset occurs because of, for example, the accuracy of wiring on the substrate and variations of parts in addition to the phase offset in 90-degree phase shifters 17-4 and 26-4. Therefore, with these phase offsets for output signals of QPSK/OOK modulation apparatus 10 and QPSK/OOK modulation apparatus 20, there is a possibility that the quadrature offset in an I/Q signal is caused upon generating a QPSK modulation signal, and that the loss of a combination power (i.e. decrease of ON power) upon generating an OOK modulation signal and the degradation of suppression characteristics (i.e. increase of OFF power) upon cancellation and combination, that is, the degradation of the ON/OFF ratio is caused.

The problem of the quadrature offset in an I/Q signal and the degradation of the ON/OFF ratio, in particular, the problem of power loss grows when QPSK/OOK modulation apparatus 10 and QPSK/OOK modulation apparatus 20 operate in higher frequencies. Although it is possible to convert frequencies into low frequencies using a divider and compare phases in the case of operations in a micro waveband like the 5 GHz band, it is difficult to realize a divider itself in the case of operations in the 60 GHz band. Further, for the degradation of the ON/OFF ratio, for example, when there is a phase offset of 5 degrees in 90-degree phase shifters 17-4 and 26-4, the maximum signal power loss in 60 GHz QPSK/OOK modulation apparatus 10 and QPSK/OOK modulation apparatus 20 is about 5 dB. Further, if this phase offset in the 90-degree phase shifters is caused by a physical form such as the form of parts, the phase offset in the 5 GHz band is equal to or less than one-tenth, that is, the maximum signal power loss is extremely low, so that it is possible to ignore the detrimental effects due to this loss.

In view of the above points, it is therefore an object of the present invention to provide a modulation apparatus and demodulation apparatus that can generate and demodulate phase modulation signals and amplitude modulation signals, correct the I/Q quadrature offset and alleviate the degradation of the ON/OFF ratio.

Means for Solving the Problem

One aspect of the modulation apparatus of the present invention, which modulates a radio frequency signal subjected to amplitude modulation or phase modulation, employs a configuration having: a phase shifter that shifts a phase of a carrier wave; a generating section that generates an I signal and a Q signal according to an amplitude modulation mode or phase modulation mode; a multiplying section that generates a first mixed signal by multiplying the I signal and the carrier wave, and generates a second mixed signal by multiplying the Q signal and the carrier wave of the phase shifted in the phase shifter; a combining section that generates a radio frequency signal by adding the first mixed signal and the second mixed signal; and a phase control section that adjusts an amount of shift in the phase shifter based on the radio frequency signal of the amplitude modulation mode.

With this configuration, by generating an amplitude signal utilizing both branches of the I signal (in-phase component) and the Q signal (quadrature component), estimating the phase offset between the I signal carrier wave and the Q signal carrier wave based on the amplitude modulation signal, and tuning a phase shifter to eliminate the phase offset, it is possible to add the I signal and the Q signal by a desired phase offset, thereby suppressing the amplitude reduction caused by the phase offset and reducing power loss.

Another aspect of the modulation apparatus of the present invention, which modulates a radio frequency signal subjected to on-off-keying modulation or quadrature phase shift keying modulation, employs a configuration having: a signal generating section that generates an I signal and a Q signal according to a modulation scheme; a first baseband processing section that performs baseband processing of the I signal, and generates a first baseband signal; a second baseband processing section that performs baseband processing of the Q signal, and generates a second baseband signal; a local oscillator that generates a carrier wave; a phase shifter that shifts a phase of the carrier wave; a first mixer that generates a first mixed signal by multiplying the carrier wave generated in the local oscillator and the first baseband signal; a second mixer that generates a second mixed signal by multiplying the carrier wave of the phase shifted in the phase shifter and the second baseband signal; a combining section that generates a radio frequency signal by adding the first mixed signal and the second mixed signal; and a phase control section that estimates a phase offset between an actual phase difference of carrier waves of the first and second mixed signals and a target phase difference of the carrier waves of the first and second mixed signals, and controls an amount of shift in the phase shifter to eliminate the phase offset.

With this configuration, by generating an OOK modulation signal utilizing both branches of the I signal (in-phase component) and the Q signal (quadrature component), estimating the phase offset between the I signal carrier wave and the Q signal carrier wave based on the amplitude modulation signal, and tuning a phase shifter to eliminate the phase offset, it is possible to add the I signal and the Q signal by a desired phase offset, thereby alleviating the degradation of the ON/OFF ratio upon OOK modulation and correcting the I/Q quadrature offset upon QPSK modulation.

An aspect of the demodulation apparatus of the present invention, which demodulates a radio frequency signal subjected to amplitude modulation or phase modulation, employs a configuration having: a phase shifter that shifts a phase of a carrier wave; a multiplying section that generates an I signal by multiplying the radio frequency signal by the carrier wave, and generates a Q signal by multiplying the radio frequency signal by the carrier wave of the phase shifted in the phase shifter; and a phase control section that controls an amount of shift in the phase shifter, wherein the phase control section adjusts the amount of shift in the phase shifter, based on an in-phase signal combining the I signal and the Q signal acquired by controlling the phase shifter such that the I signal and the Q signal of an amplitude modulation mode are in-phase.

With this configuration, by demodulating an amplitude modulation signal utilizing both branches of the I signal (in-phase component) and the Q signal (quadrature component), estimating the phase offset between the I signal carrier wave and the Q signal carrier wave based on the amplitude modulation signal, and tuning a phase shifter to eliminate the phase offset, it is possible to output an I/Q signal with good orthogonality upon receiving a QPSK signal, thereby alleviating the degradation of demodulation performance due to a quadrature offset.

Advantageous Effects of Invention

According to the present invention, in a modulation and demodulation apparatus that generates QPSK modulation signals and OOK modulation signals, by generating and demodulating a QPSK modulation signal using an I signal and a Q signal that are orthogonal to each other, and by detecting and correcting an offset from a desirable phase difference between the I signal and the Q signal upon generating a OOK modulation signal by adding the I signal and the Q signal at the desirable phase offset, it is possible to correct the I/Q quadrature offset and alleviate the degradation of the ON/OFF ratio.

BEST MODE FOR CARRYING OUT THE INVENTION

Embodiments of the present invention will be explained below in detail with reference to the accompanying drawings.

Embodiment 1

Figure 3:
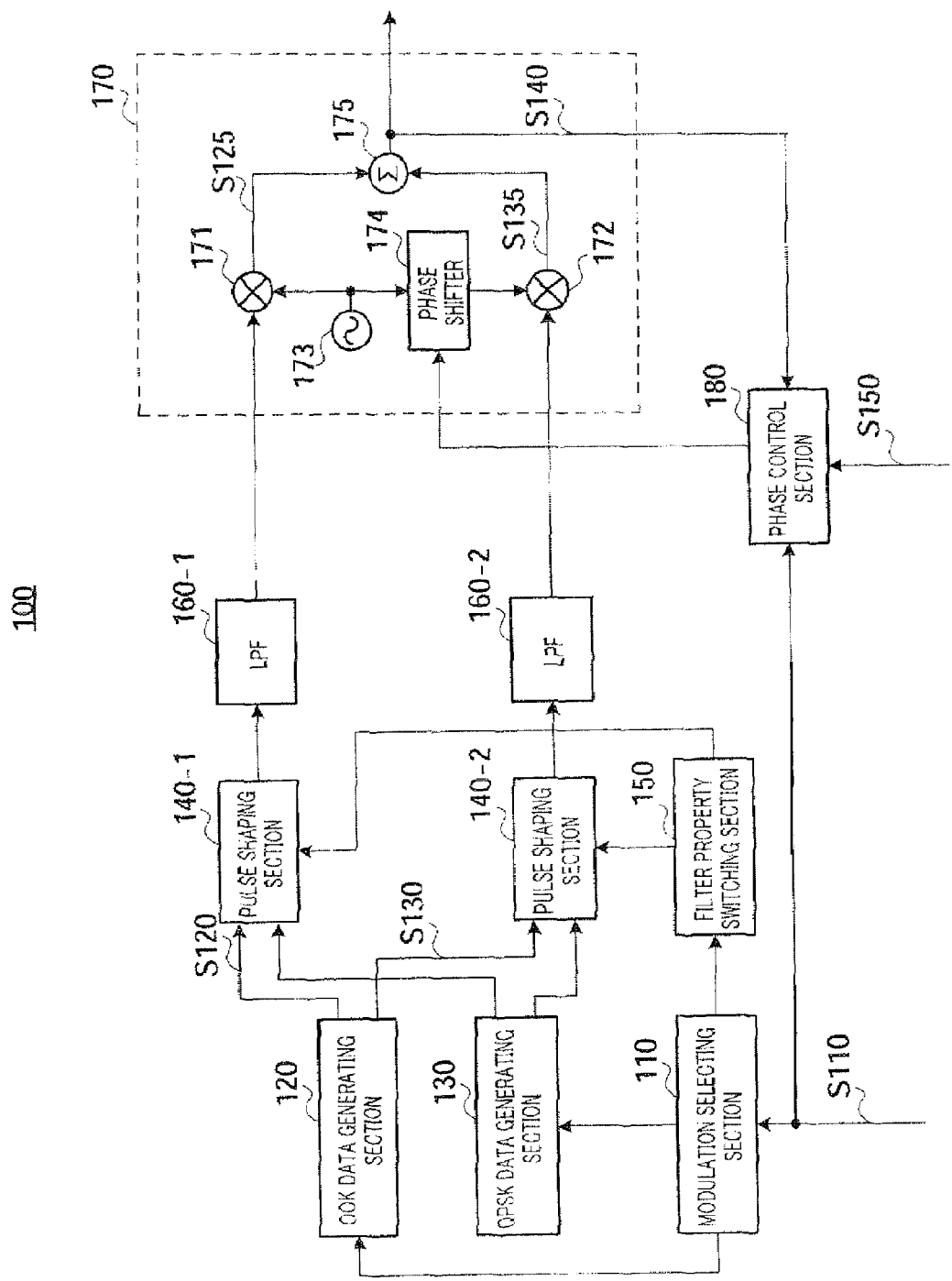
FIG. 3 is a block diagram showing the main components of a QPSK/OOK modulation apparatus according to Embodiment 1 of the present invention.

FIG. 3 is a block diagram showing the main components of QPSK/OOK modulation apparatus 100 according to Embodiment 1 of the present invention. The present embodiment is applied as an example to a QPSK/OOK modulation apparatus used in QPSK modulation and OOK modulation transmitting and receiving apparatuses.

In FIG. 3, QPSK/OOK modulation apparatus 100 is provided with modulation selecting section 110, OOK data generating section 120, QPSK data generating section 130, pulse shaping sections 140-1 and 140-2, filter property switching section 150, LPF's (Low Pass Filters) 160-1 and 160-2, QPSK modulating section 170 and phase control section 180.

Modulation selecting section 110 receives as input modulation indication signal S110 indicating by which modulation scheme, OOK modulation or QPSK modulation, transmission data is generated, and controls on and off of OOK data generating section 120 or QPSK data generating section 130 according to modulation indication signal S110. Further, modulation selecting section 110 outputs a command to change the filter property, to filter property switching section 150.

OOK data generating section 120 generates I(t) signal S120 and Q(t) signal S130 as OOK transmission data. In this case, OOK data generating section 120 generates I(t) signal S120 and Q(t) signal S130 represented by equations 7 and 8, as I(t) signal S120 and Q(t) signal S130.

(Equation 7)

$$I(t) = \alpha \cos D(t) \quad [7]$$

(Equation 8)

$$Q(t) = -\alpha \sin \phi D(t) \quad [8]$$

Figure 1:
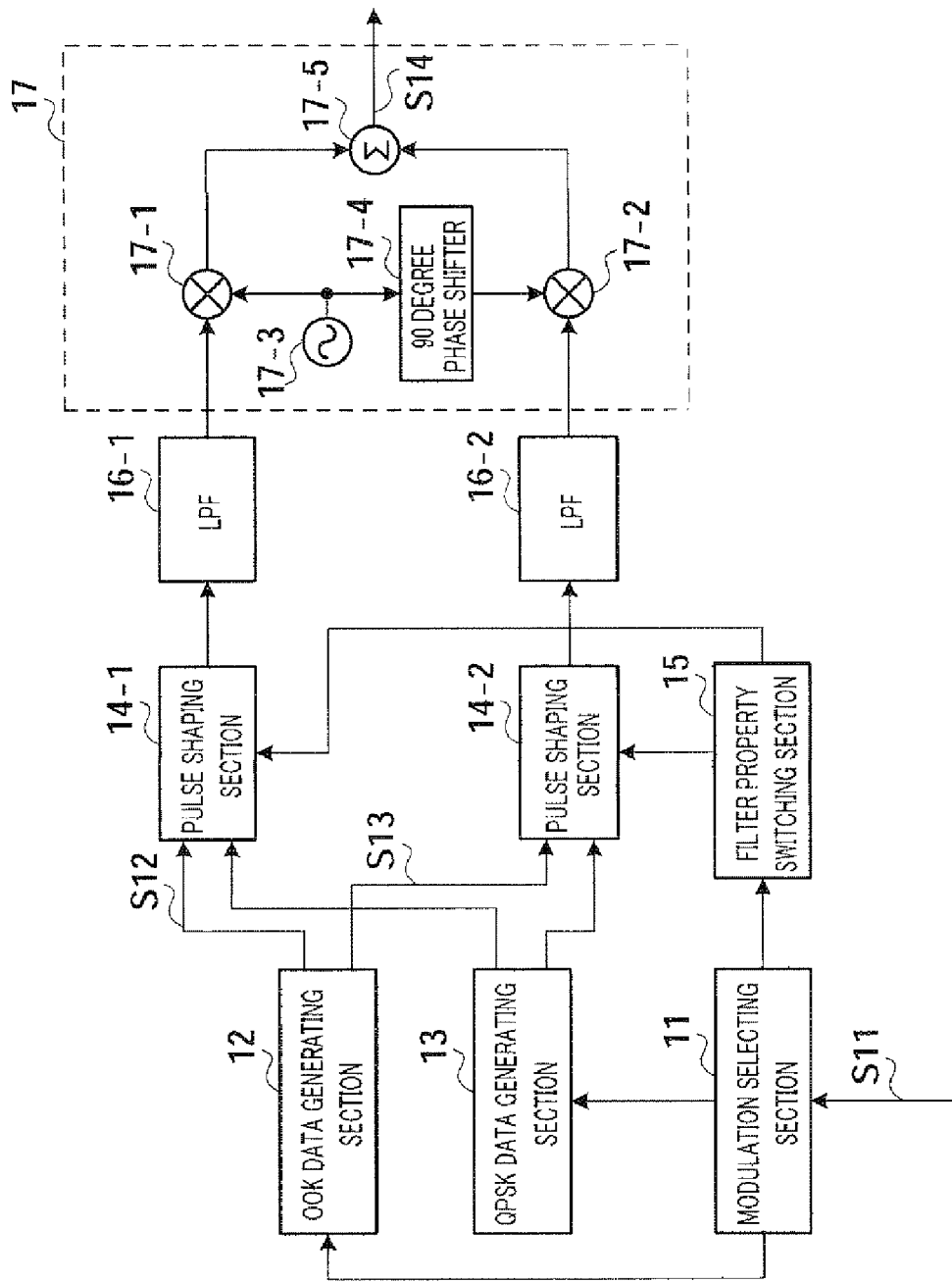
FIG. 1 is a block diagram showing the main components of a conventional QPSK/OOK modulation apparatus.
Figure 2:
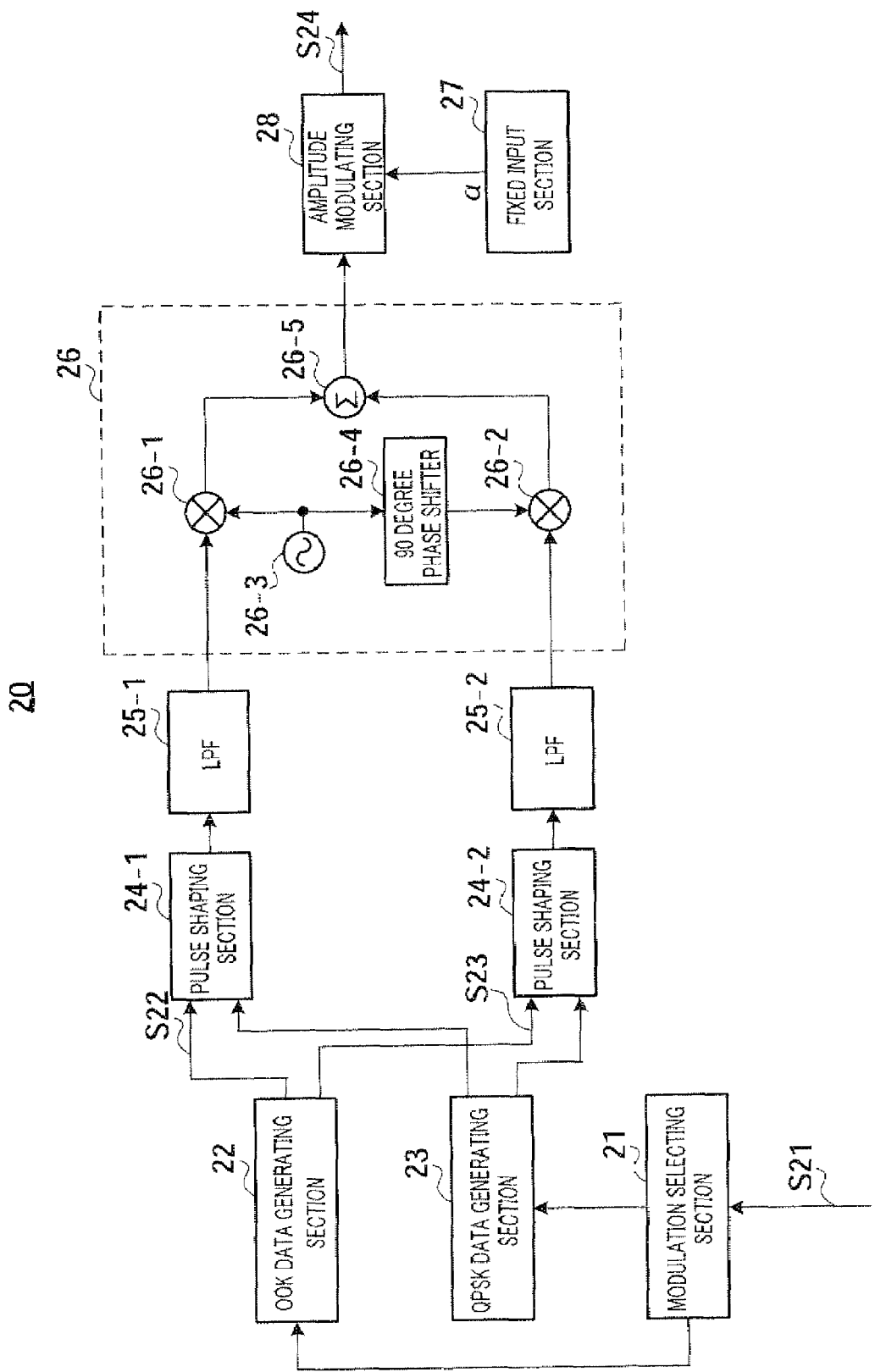
FIG. 2 is a block diagram showing the main components of a conventional QPSK/OOK modulation apparatus.

Here, $\phi$ is a constant (e.g. 45 degrees), and $\alpha$ is a constant gain. As shown in equations 7 and 8, I(t) signal S120 and Q(t) signal S130 adopt different mathematical representation from corresponding I(t) signal S12 and Q(t) signal S13 shown in FIG. 1. That is, QPSK/OOK modulation apparatus 100 generates an OOK-modulated signal in a different method from QPSK/OOK modulation apparatus 10.

QPSK data generating section 130 generates I(t) signal S120 and Q(t) signal 5130 as QPSK transmission data.

(Equation 9)

$$I(t) = \alpha_1 \cos \phi \quad [9]$$

(Equation 10)

$$Q(t) = \alpha_2 \sin \phi \quad [10]$$

Here, α1 and α2 are set to 1 or −1 in accordance with each symbol of QPSK data. Further, $\phi$ is set to a fixed value (e.g. 45 degrees).

Pulse shaping sections 140-1 and 140-2 filter the OOK transmission data or the QPSK transmission data to meet spectral mask that is defined by the standard or the like.

Filter property switching section 150 switches the filter properties of pulse shaping sections 140-1 and 140-2 between OOK transmission data and QPSK transmission data, according to the command outputted from modulation selecting section 110 to change the filter properties.

LPF's 160-1 and 160-2 are low pass filters and remove the harmonic components from the OOK transmission data or QPSK transmission data.

QPSK modulating section 170 is provided with two mixers 171 and 172 connected respectively to the outputs of LPF's 160-1 and 160-2, oscillator 173 that generates carrier waves, phase shifter 174 that shifts the phase of the carrier waves, and summer 175 that adds I signal S125 outputted from mixer 171 and Q signal S135 outputted from mixer 172. Mixer 171 is directly connected to a carrier wave generated by oscillator 173, while mixer 172 is indirectly connected to a carrier wave via phase shifter 174.

Phase shifter 174 is a variable phase shifter and, for example, has a variable capacitor with variable capacitance.

Phase shifter 174 shifts a phase by controlling the voltage applied to the variable capacitor and changing the capacitance.

That is, by controlling the voltage applied to the capacitor and changing the capacitance based on a control signal outputted from phase control section 180, phase shifter 174 shifts the phase of a carrier wave generated in oscillator 173. Further, QPSK/OOK modulation apparatus 100 of the present embodiment adopts a general configuration to generate a QPSK modulation signal and generates an OOK modulation signal, and, consequently, the initial phase shift value of phase shifter 174 is normally set the 90 degrees.

Phase modulation section 180 receives as input modulation indication signal S110 indicating by which modulation scheme, OOK modulation or QPSK modulation, transmission data is generated, and performs phase control of phase shifter 174 according to modulation indication signal S110.

Phase control section 180 has two main functions for phase control. The first function is to estimate the phase offset in phase shifter 174 according to output RF signal S140, using a phase offset estimation method, which will be described later.

The second function is to tune phase shifter 174 according to an estimation value of the phase offset in phase shifter 174 such that the phase difference between the carrier wave of I signal S125 and the carrier wave of Q signal S135 is kept at 0 degrees or 180 degrees, when modulation indication signal S110 indicates OOK modulation. Further, phase control section 180 tunes phase shifter 174 such that the phase difference between the carrier wave of I signal S125 and the carrier wave of Q signal S135 is kept at 90 degrees, when modulation indication signal S110 indicates QPSK modulation. Phase control section 180 tunes the phase of a carrier wave by adjusting the capacitance of phase shifter 174.

Thus, for example, when modulation indication signal S110 indicates OOK modulation, output RF signal S140 corresponding to data "1" is generated in the case of in-phase combination whereby the phase difference between carrier waves is 0 degrees, and output RF signal S140 corresponding to data "0" is generated in the ease of reversed-phase-combination whereby the phase difference between carrier waves is 180 degrees.

Further, phase control section 180 controls the start of conducting a phase control by trigger signal S150. Trigger signal S150 adopts various signal waveforms. For example, trigger signal S150 is a single rectangular pulse, and phase control section 180 can start conducting a phase control in the rising edge of the rectangular pulse, which is synchronized with the start timing of a certain PHY frame. In this case, phase control section 180 conducts phase control of phase shifter 174 once.

Alternatively, trigger signal S150 is a rectangular pulse sequence, and phase control section 180 can start conducting a phase control in the rising edge of each rectangular pulse in the pulse sequence, which is synchronized with the start of the associated PHY frame. As a result, phase control section 180 conducts a phase control of phase shifter 174 on a per PHY frame basis.

Alternatively, when trigger signal 150 is a single rectangular pulse, phase control section 180 can start conducting a phase control in the rising edge of the rectangular pulse in the adjusting stage before shipment from factory.

The operations of QPSK/OOK modulation apparatus 100 of FIG. 3, which is formed as above, will be explained below.

When modulation indication signal S110 indicates OOK modulation, modulation selecting section 110 activates OOK data generating section 120 and deactivates QPSK data generating section 130. Modulation selecting section 110 also commands filter property switching section 150 to switch the filter properties of pulse shaping sections 140-1 and 140-2 for OOK data.

I(t) signal S120 and Q(t) signal S130 generated in OOK data generating section 120 are represented by equations 7 and 8. I(t) signal S120 and Q(t) signal S130 shown in equations 7 and 8 differ from I(t) signal S22 and Q(t) signal S23 corresponding to equations 4 and 5. Further, I(t) signal S120 and Q(t) signal S130 differ from I(t) signal S12 and Q(t) signal S13 corresponding to equations 1 and 2.

Phase control section 180 does not conduct a phase control of phase shifter 174 before phase control section 180 is triggered by trigger signal S150, and, consequently, there is a possibility that the phase difference between the carrier wave of I signal S125 outputted from mixer 171 and the carrier wave of Q signal S135 outputted from mixer 172 is not 0 degrees, that is, a phase offset is produced. In this ease, output RF signal S140 of QPSK/OOK modulation apparatus 100 is represented by equation 11.

(Equation 11)

$$S(t) = (I(t)\sin\omega t + Q(t)\cos\omega t) \quad [11]$$
$$= \alpha D(t)(\cos\phi\sin\omega t - \sin\phi\cos(\omega t + \delta_2))$$

Here, $\delta_2$ is a phase offset to show how much the amount of phase shift in phase shifter 174 is offset from 0 degrees (i.e. desired phase difference).

To conduct a phase control, first, phase control section 180 needs to estimate the phase offset in phase shifter 174. Am estimation method based on the maximum likelihood ("ML") principle (hereinafter "maximum likelihood estimation method") described below, is used to achieve this goal.

In the maximum likelihood estimation method, the logarithm likelihood function is represented as shown in equation 12.

(Equation 12)

$$\ln\Lambda(\delta_2) = \frac{1}{N_0}\int_0^T S^2(t)\,dt - \frac{2}{N_0}\int_0^T R(t)S(t)\,dt \quad [12]$$

Here, T is the observation interval, which may correspond to a time containing several OOK symbol durations. As shown in equation 13, R(t) represents output RF signal S140 subject to the influence of noise.

(Equation 13)

$$R(t)=S(t)+N(t) \quad [13]$$

N(t) is Gaussian white noise with power spectral density $N_0$.

The derivatives of $\ln\Lambda(\delta_2)$ with respect to $\delta_2$ are set to zero in equations 11 to 13, thereby finding equations 14 and 15.

(Equation 14)

$$\alpha T(\cos\phi + \sin\phi\sin\delta_2) = 2\int_0^T R(t)D(t)\sin\omega t\,dt \quad [14]$$

(Equation 15)

$$\alpha T \cos\phi \cos\delta_2 = 2\int_0^T R(t)D(t)\sin(\omega t + \delta_2)\,dt \quad [15]$$

Based on equations 14 and 15, equation 16 is acquired.

(Equation 16)

$$\delta_2 = \arccos\left[\frac{2\int_0^T R(t)D(t)\cos(\omega t)\,dt}{\alpha T \sin\phi}\right] \quad [16]$$

Although the above-described maximum likelihood estimation method is optimal in the statistical sense, it involves integral operations and therefore results in higher computational complexity. Furthermore, the maximum likelihood estimation method also needs to know the input data signal D(t) within the observation interval T.

As another method, an estimation method based on signal amplitude measurement can be used to estimate the phase offset in phase shifter 174.

According to this method, equation 17 is acquired by sampling output RF signal S140 subject to the influence of noise at 2N different time points t1, t2, t2N in equations 11 and 13.

(Equation 17)

$$R(t_l) = \alpha D(t_l)[\cos\phi \sin\omega t_l - \sin\phi \cos(\omega t_l + \delta_2)] + N(t_l) \quad [17]$$

Here, the relationship of l=1, 2, ..., 2N holds. Equation 18 is acquired by averaging first N samples approximately to smooth noise. Here, it is not necessary to average all samples.

(Equation 18)

$$R_1 \approx \alpha(\cos\phi X_1 + \sin\phi \sin\delta_2 X_1 - \sin\phi \cos\delta_2 Y_1) \quad [18]$$

Here, $R_1$, $X_1$ and $Y_1$ are represented by equations 19, 20 and 21, respectively.

(Equation 19)

$$R_1 = (R(t_1) + R(t_2) + \ldots + R(t_N))/N \quad [19]$$

(Equation 21)

$$X_1 = (D(t_1)\sin\omega t_1 + D(t_2)\sin\omega t_2 + \ldots + D(t_N)\sin\omega t_N)/N \quad [20]$$

(Equation 21)

$$Y_1 = (D(t_1)\cos\omega t_1 + D(t_2)\cos\omega t_2 + \ldots + D(t_N)\cos\omega t_N)/N \quad [21]$$

Next, equation 22 is acquired by averaging the rest of N samples approximately.

$$R_2 \approx \alpha(\cos\phi X_2 + \sin\phi \sin\delta_2 X_2 - \sin\phi \cos\delta_2 Y_2) \quad [22]$$

Here, $R_2$, $X_2$ and $Y_2$ are represented by equations 23, 24 and 25, respectively.

(Equation 23)

$$R_2 = (R(t_{N+1}) + R(t_{N+2}) + \ldots + R(t_{2N}))/N \quad [23]$$

(Equation 24)

$$X_2 = (D(t_{N+1})\sin\omega t_{N+1} + D(t_{N+2})\sin\omega t_{N+2} \ldots + D(t_{N+1})\sin\omega t_{2N})/N \quad [24]$$

(Equation 25)

$$Y_2 = (D(t_{N+1})\cos\omega t_{N+1} + D(t_{N+2})\cos\omega t_{N+2} + \ldots + D(t_{2N})\cos\omega t_{2N})/N \quad [25]$$

Equation 26 is acquired from equations 18 and 20.

(Equation 26)

$$\delta_2 = \arccos\left[\frac{1}{\alpha\sin\phi}\left(\frac{R_1 X_2 - R_2 X_1}{Y_1 X_2 - Y_2 X_1}\right)\right] \quad [26]$$

Compared with the maximum likelihood estimation method, the estimation method based on signal amplitude measurement involves the lower computational complexity. However, this method is suboptimal. Furthermore, this method also needs to know the input data signal D(t) at 2N sampling times.

In addition to estimation methods based on the above described maximum likelihood estimation method and signal amplitude measurement, it is equally possible to use a method based on signal power measurement, which will be explained later, to estimate the phase offset in phase shifter 174.

According to equations 11 and 13, the signal power of output RF signal S140 subject to the influence of noise is represented by equation 27.

(Equation 27)

$$\begin{aligned} P_s &= \frac{1}{T}E\left[\int_0^T R^2(t)\,dt\right] \\ &= \frac{\alpha^2}{T}\int_0^T \left[\begin{array}{c}\cos\phi\sin\omega t - \\ \sin\phi\cos(\omega t + \delta_2)\end{array}\right]^2 dt + \frac{N_0}{2} \\ &= \frac{\alpha^2}{2}[1 + \sin 2\phi \sin\delta_2] + \frac{N_0}{2} \end{aligned} \quad [27]$$

Here, $E[\cdot]$ represents the expectation operator. Equation 28 is acquired from equations 27.

(Equation 28)

$$\delta_2 = \arcsin\left[\frac{1}{\sin 2\phi}\left(\frac{2P_s - N_0}{\alpha^2} - 1\right)\right] \quad [28]$$

Compared to the maximum likelihood estimation method and other estimation methods based on signal amplitude measurement, the estimation method based on signal power measurement needs not know the input data signal D(t) with the observation interval T. Instead, this method needs to know noise power.

According to the estimation value of the phase offset $\delta_2$ in phase shifter 174 acquired using the maximum likelihood estimation method, methods based on signal amplitude measurement or methods based on signal power measurement, phase control section 180 tunes phase shifter 174 and eliminates the phase offset $\delta_2$ to make the phase offset $\delta_2$ zero. According to equation 11, tuned output RF signal S140 is represented by equation 29.

(Equation 29)

$$S(t) = \alpha D(t)(\cos\phi\sin\omega t - \sin\phi\cos\omega t) \quad [29]$$
$$= \alpha D(t)\sin(\omega t - \phi)$$

As a result, it is known from equation 27 that output RF signal S140 is in the form of an OOK modulation wave.

Further, in equations 7 and 8, I(t) signal S120 and Q(t) signal S130 generated in OOK data generating section 120 have amplitudes that change in opposite directions and the same, fixed phase. Actually, to generate an OOK modulation wave, alternative signal waveforms shown below are also possible in I(t) signal S120 and Q(t) signal S130.

(1) I(t) signal S120 and Q(t) signal S130 are signals in which amplitudes change in opposite directions and in which the fixed phases are opposite.

(2) I(t) signal S120 and Q(t) signal S130 are signals in which amplitudes change in opposite directions and in which the phase difference between fixed phases is 180 degrees.

(3) I(t) signal S120 and Q(t) signal S130 are signals in which amplitudes change in opposite directions and in which the phase sum of the fixed phases is 180 degrees.

(4) I(t) signal S120 and Q(t) signal S130 are signals in which amplitudes change in opposite directions and in which the fixed phases are opposite.

(5) I(t) signal S120 and Q(t) signal S130 are signals in which amplitudes change in the same direction and in which the phase difference between the fixed phases is 180 degrees.

(6) I(t) signal S120 and Q(t) signal S130 are signals in which amplitudes change in the same direction and in which the phase sum of the fixed phases is 180 degrees.

It will be appreciated by a person skilled in the art that, according to various forms of I(t) signal S120 and Q(t) signal S130, output signal 140 of QPSK/OOK modulation apparatus 100 may adopt different mathematical representation from equations 11 and 27. The above-described estimation mathematical representation of the phase offset estimation method, for example, equations 16, 24 and 28, may also be different.

When modulation indication signal S110 indicates QPSK modulation, modulation selecting section 110 activates QPSK data generating section 130 and deactivates OOK data generating section 120. Modulation selecting section 110 also commands filter property switching section 150 to switch the filter properties of pulse shaping sections 140-1 and 140-2 for QPSK data.

QPSK data generating section 130 outputs the I(t) signal and Q(t) signal represented by equations 9 and 10, based on four binary codes (00, 01, 10, and 11) or four symbols of a QPSK data signal.

There is a possibility that a phase offset is produced in phase shifter 174 before phase control section 180 conducts a phase control of phase shifter 174. In this case, according to equations 28 and 29, output RF signal S140 of QPSK/OOK modulation apparatus 100 is represented by equation 30.

(Equation 30)

$$S(t) = I(t)\sin\omega t + Q(t)\cos\omega t \quad [30]$$
$$= \pm\cos\phi\sin\omega t \pm \sin\phi\cos(\omega t - \delta_2)$$

Similar to equation 11, $\delta_2$ is a phase offset to show how much the amount of phase shift in phase shifter 174 is offset from 90 degrees (i.e. desired phase difference).

After acquiring an estimation value of the phase offset in phase shifter 174 using the above-described method of estimating a phase offset, phase control section 180 tunes phase shifter 174 and eliminates the phase offset $\delta_2$ to make the phase offset $\delta_2$ zero. According to equation 30, tuned output RF signal S140 is represented by equation 31.

(Equation 31)

$$S(t) = \pm\sin(\omega t \pm \phi) \quad [31]$$

As known from equation 31, in association with the four symbols of a QPSK data signal, output RF signal S140 switches between four phases having phase shifts of 45, 135, 225 and 315 degrees with respect to a carrier wave, and is in the form of a QPSK modulation wave.

It will be appreciated by a person skilled in the art that it is possible to use the above-noted maximum likelihood estimation method, the estimation method based on signal amplitude measurement, and the estimation method based on signal power measurement, to estimate the phase offset in phase shifter 174. However, output RF signal S140 of QPSK modulation apparatus 100 has different mathematical representation between OOK modulation and QPSK modulation, and, consequently, estimation mathematical representation for these phase offset estimation methods, for example, equations 16, 24 and 28, may be different between OOK modulation and QPSK modulation. Therefore, phase control section 180 may adequately adjust the phase offset estimation method in accordance with modulation indication signal S110.

Figure 4:
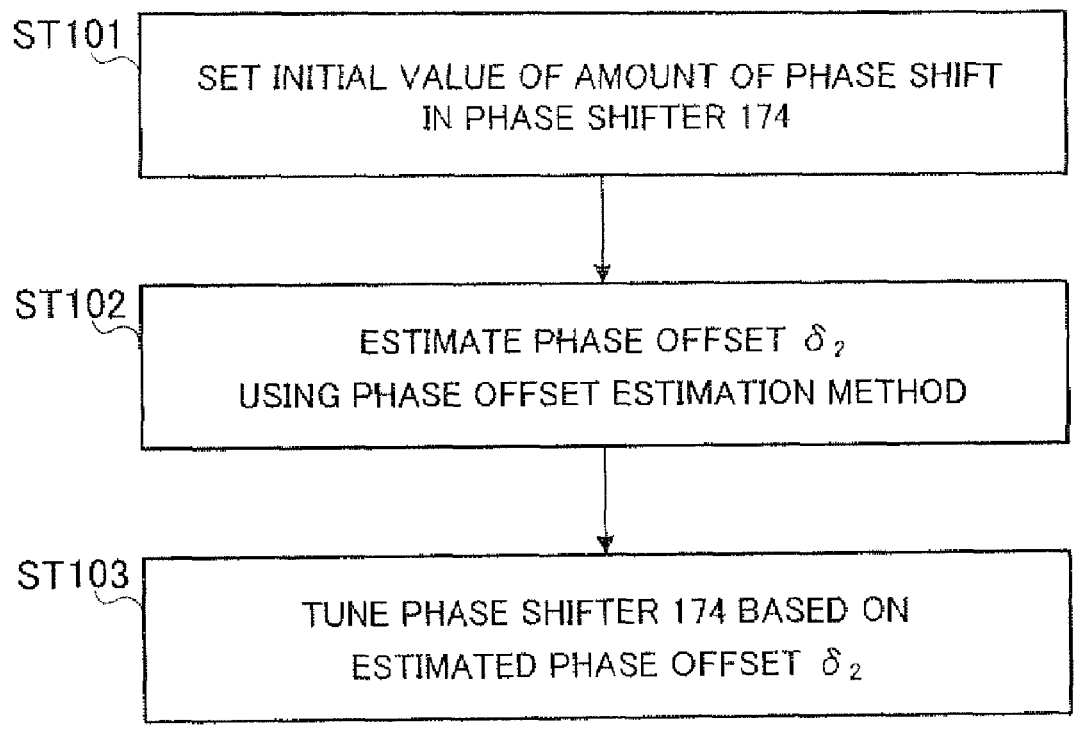
FIG. 4 is a flowchart illustrating a phase control method according to Embodiment 1.

FIG. 4 is a flowchart illustrating the phase control method according to the present embodiment. In the figure, "ST" represents each step in the flow.

In ST 101, the phase shift value of phase shifter 174 is set to an initial value. The initial phase shift value of phase shifter 174 is set to 90 degrees by adequately adjusting the capacitance of phase shifter 174. In ST 102, the phase offset $\delta_2$ in phase shifter 174 is estimated using a phase offset estimation method such as a method based on signal power measurement. In ST 103, phase shifter 174 is tuned according to the estimation value of the phase offset $\delta_2$ in the phase shifter. This is implemented by readjusting the capacitance of phase shifter 174.

As described above, according to the present embodiment, I and Q branches are both utilized to implement OOK modulation, and the I and Q branches both operate in synchronization with each other, so that variations in the ground levels or the like are corrected or cancelled out with each other, thereby improving operational stability. Furthermore, an additional amplitude modulating section is not required, so that it is equally possible to reduce the complexity of implementation.

More importantly, the present embodiment takes into account the detrimental effects of phase offset for QPSK/OOK modulation apparatus 100. That is, by tuning phase shifter 174 in accordance with a phase offset estimation value, the detrimental effects of phase offset for QPSK/OOK modulation apparatus 100 are eliminated. As a result, especially in 60 GHz, it is possible to significantly improve the ON/OFF ratio of an output RF signal of QPSK/OOK modulation apparatus 100. Further, by adjusting the phase offset, the quadrature offset upon I/Q signal transmission becomes small, so that the effect of improving the accuracy of modulation in the QPSK modulation apparatus can be expected.

The modulation apparatus that can correct the I/Q quadrature offset and alleviate the degradation of the ON/OFF ratio, has been described above. Further, although a combination of an OOK modulation signal and QPSK modulation signal is used in the above explanation, it is possible to implement the present invention using ASK modulation or M-ary ASK modulation, which is the M-ary version of this ASK modulation, as the amplitude modulation scheme. In M-ary ASK modulation, α takes a M-ary gain in equations 7 and 8. Further, it is equally possible to implement the present invention using BPSK modulation, π/2-shift BPSK modulation, or a multi-phase modulation scheme greater of 8PSK.

That is, it is possible to generate an I signal and Q signal according to the amplitude modulation mode or phase modulation mode, generate the first mixed signal by multiplying the I signal and the carrier wave, generate a second mixed signal by multiplying the Q signal and the carrier wave of a phase shifted in a phase shifter, generate radio frequency signals by adding the first and second mixed signals, and adjust the amount of shift in the phase shifter based on the radio frequency signals of the amplitude modulation mode.

In this case, for example, in the amplitude modulation mode, the amount of shift in the phase shifter is adjusted using the above-described estimation method, based on the amplitude difference between the first radio frequency signal and the second radio frequency signal that are modulated to different amplitude levels.

Further, although the order of transmitting the amplitude modulation signal and phase modulation signal is not described above, it is possible to transmit the amplitude modulation signal first, and, after performing a phase adjustment for transmission and reception based on the amplitude modulation signal, transmit the phase modulation signal. Further, it is equally possible to insert a beacon in a transmission frame and perform a phase adjustment using the beacon.

Embodiment 2

Figure 5:
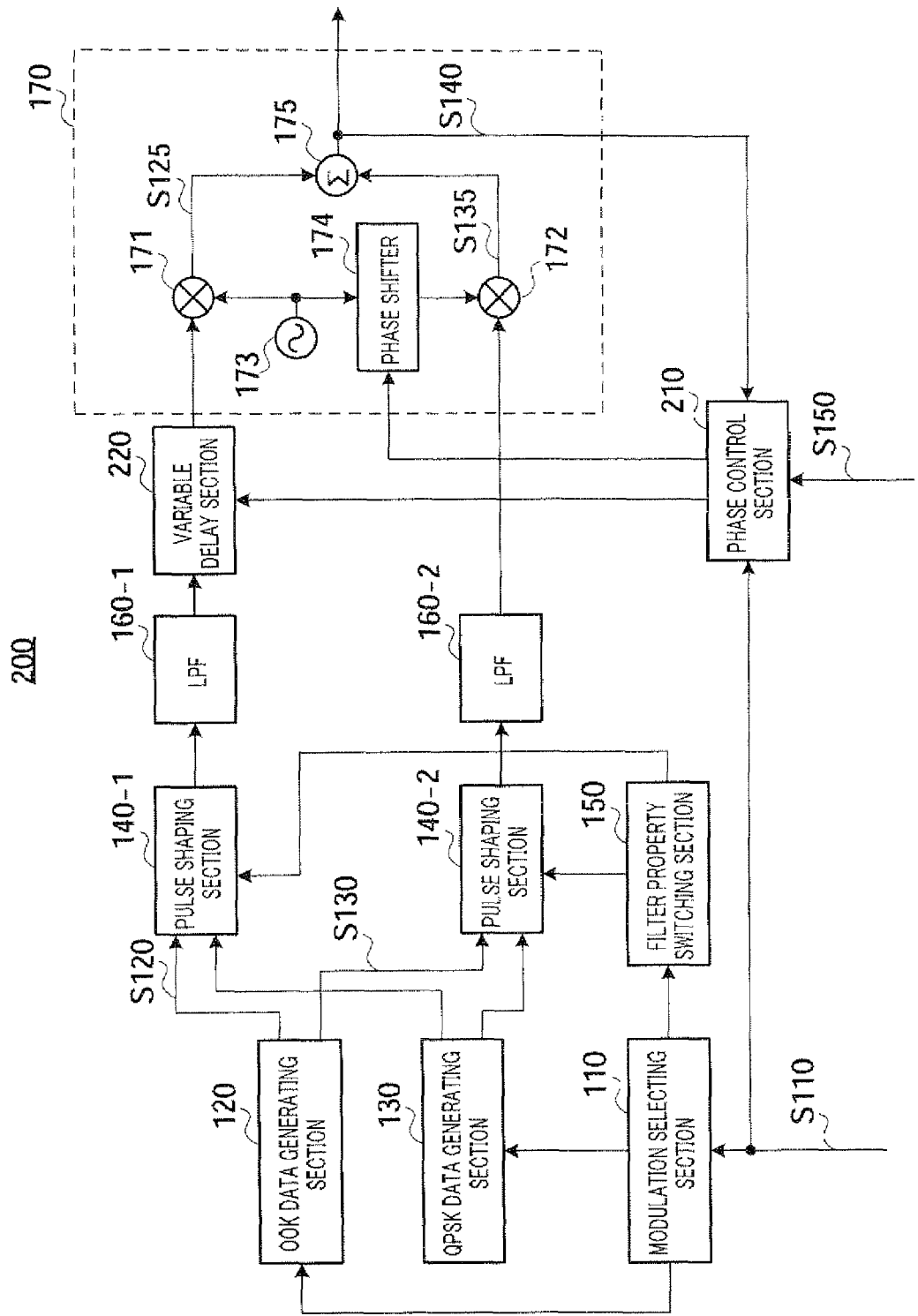
FIG. 5 is a block diagram showing the main components of a QPSK/OOK modulation apparatus according to Embodiment 2 of the present invention.

FIG. 5 is a block diagram showing the main components of QPSK/OOK modulation apparatus 200 according to Embodiment 2 of the present invention. In explanation of the present embodiment, the same components as in FIG. 3 will be assigned the same reference numerals and their explanation will be omitted.

Differences from Embodiment 1 lie in that QPSK/OOK modulation apparatus 200 according to the present embodiment employs a configuration replacing phase control section 180 with phase control section 210 and adding variable delay section 220 between LPF 160-1 and mixer 171.

Variable delay section 220 is provided between LPF 160-1 and mixer 171, and gives a variable delay to I(t) signal S120. Variable delay section 220 is formed with, for example, multistage transistors, and tunes the amount of delay by adjusting the bias voltage of the transistors. Further, it is possible to change the amount of delay by changing the combination of transistors or the number of stages of transistors. By this means, variable delay section 220 can provide a relatively large amount of delay. On the other hand, as described above, phase shifter 174 has a capacitor with variable capacitance and tunes the amount of delay by adjusting the voltage applied to the capacitor and controlling the capacitance. By this means, phase shifter 174 can finely adjust relatively small phase differences. Further, it is possible to provide variable delay section 220 between LPF 160-2 and mixer 172 to provide a variable delay to Q(t) signal S130.

Phase control section 210 conducts a phase control of variable delay section 220 and phase shifter 174. Phase control section 210 has two main functions for phase control. The first function is to, using the above-described phase offset estimation method, estimate the path difference delay generated between the transmission path of the I(t) signal and the transmission path of the Q(t) signal (hereinafter "I/Q path difference delay") due to variations of elements in pulse shaping sections 140-1 and 140-2 and LPF's 160-1 and 160-2, and also estimate the phase offset in phase shifter 174, based on output RF signal S140. The second function is to tune variable delay section 220 according to the estimation value of I/Q path difference delay and to tune phase shifter 174 according to the estimation value of phase offset in phase shifter 174. Phase control section 210 tunes variable delay section 220 by adjusting its bias voltage, while phase control section 210 tunes phase shifter 174 by adjusting its capacitance.

Thus, phase control section 210 can cancel the I/Q path difference delay generated between the transmission path of the I(t) signal and the transmission path of the Q(t) signal due to variations of elements of pulse shaping sections 140-1 and 140-2 and LPF's 160-1 and 160-2, using variable delay section 220, and, furthermore, finely adjust the phase difference between the carrier wave of I signal S125 and the carrier wave of Q signal S135.

Further, as in Embodiment 1, phase control section 210 controls the start of conducting a phase control by trigger signal S150.

The operations of QPSK/OOK modulation apparatus 200, which is formed as above, will be explained below.

When modulation indication signal 110 indicates OOK modulation, modulation selecting section 110 activates OOK data generating section 120 and deactivates QPSK data generating section 130. Modulation selecting section 110 also commands filter property switching section 150 to switch the filter properties of pulse shaping sections 140-1 and 140-2 for OOK data.

As in Embodiment 1, I(t) signal S120 and Q(t) signal S130 generated in OOK data generating section 120 are represented by equations 7 and 8.

Before phase control section 210 is triggered by trigger signal S150, phase control section 210 does not conduct a phase control of variable delay section 220 and phase shifter 174, and, consequently, there is a possibility that the I/Q path difference delay and the phase offset in phase shifter 174 are found in QPSK/OOK modulator 200. In this case, output RF signal S14 of QPSK/OOK modulation apparatus 100 is represented by equation 32.

(Equation 32)

$$S(t) = I(t)\sin\omega t + Q(t)\cos\omega t \quad [32]$$
$$= \alpha D(t)(\cos(\phi - \delta_1)\sin\omega t - \sin\phi\cos(\omega t + \delta_2))$$

Here, $\delta_1$ is, I/Q path difference delay, and $\delta_2$ is a phase offset to show how much the amount of phase shift in phase shifter 174 is offset from 90 degrees.

To conduct a phase control, first, phase control section 210 needs to estimate the I/Q path difference delay and the phase offset in phase shifter 174. As the phase offset estimation method, as in Embodiment 1, it is possible to use the maximum likelihood estimation method and an estimation method based on signal amplitude measurement.

An example case will be explained below, where phase control section 210 estimates I/Q path difference delay and phase offset in phase shifter 174 using the maximum likelihood estimation method.

In the maximum likelihood estimation method, the logarithm likelihood function is represented as shown in equation 33.

(Equation 33)

$$\ln \Lambda(\delta_1, \delta_2) = \frac{1}{N_0} \int_0^T S^2(t)\,dt - \frac{2}{N_0} \int_0^T R(t)S(t)\,dt \quad [33]$$

Here, T is the observation interval, which may correspond to a time containing several OOK symbol durations. As shown in equation 13, R(t) represents output RF signal S140 subject to the influence of noise.

The derivatives of $\ln \Lambda(\delta_1, \delta_2)$ with respect to $\delta_1$ and $\delta_2$ are set to zero in equations 13, 32 and 33, thereby acquiring equations 34 and 35.

(Equation 34)

$$\alpha T(\cos(\phi - \delta_1) + \sin\phi \sin\delta_2) = 2 \int_0^T R(t)D(t)\sin\omega t\,dt \quad [34]$$

(Equation 35)

$$\alpha T \cos(\phi - \delta_1)\cos\delta_2 = 2 \int_0^T R(t)D(t)\sin(\omega t + \delta_2)\,dt \quad [35]$$

Based on equations 34 and 35, equation 16 is acquired as in Embodiment 1.

$\delta_1$ is derived by substituting equation 16 in equation 34 or equation 35.

Further, as in Embodiment 1, it is possible to estimate I/Q path difference delay and phase offset in phase shifter 174 using the above-described estimation method based on signal amplitude measurement.

With this method, equation 36 is acquired from equations 13 and 32 by sampling output RF signal 5140 subject to the influence of noise at 2N different time points t1, t2, ..., t2N.

(Equation 36)

$$R(t_l) = \alpha D(t_l)[\cos(\phi - \delta_1)\sin \omega t_l - \sin\phi \cos(\omega t_l + \delta_2)] + N(t_l) \quad [36]$$

Here, the relationship of l=1, 2, ..., 2N holds.

Equation 37 is acquired by averaging first N samples approximately to smooth noise. Here, it is not necessary to average all samples.

(Equation 37)

$$R_1 \approx \alpha(\cos(\phi - \delta_1)X_1 + \sin\phi \sin\delta_2 X_1 - \sin\phi \cos\delta_2 Y_1) \quad [37]$$

Here, $R_1$, $X_1$ and $Y_1$ are equivalent to equations 19, 20 and 21, respectively.

Next, equation 38 is acquired by averaging the rest of N samples approximately.

(Equation 38)

$$R_2 \approx \alpha(\cos(\phi - \delta_1)X_2 + \sin\phi \sin\delta_2 X_2 - \sin\phi \cos\delta_2 Y_2) \quad [38]$$

Here, $R_2$, $X_2$ and $Y_2$ are equivalent to equations 23, 24 and 25, respectively.

According to equations 37 and 38, equation 26 is acquired as in Embodiment 1.

$\delta_1$ is derived by substituting equation 26 in equation 37 or equation 38.

According to the estimation values of both I/Q path difference delay and phase offset in phase shifter 174 acquired using the maximum likelihood estimation method or the method based on signal amplitude measurement, phase control section 210 tunes variable delay section 220 and phase shifter 174 to eliminate a phase offset between an I signal and a Q signal. Thus, $\delta_1$ and $\delta_2$ are set to zero. According to equation 32, tuned output RF signal S140 is represented by equation 29.

As a result, as known from equation 27, output RF signal S140 is in the form of an OOK modulation wave.

Further, as in Embodiment 1, it will be appreciated by a person skilled in the art that, according to various forms of I(t) signal S120 and Q(t) signal S130, output signal 140 of QPSK/OOK modulation apparatus 200 may adopt different mathematical representation from equation 32 and equation 27. The above-described estimation mathematical representation of the phase offset estimation method, for example, equations 16 and 24, may also be different.

Further, according to the present embodiment, unlike Embodiment 1, it is difficult to estimate I/Q path difference delay and phase offset in phase shifter 174 using the above-described estimation method based on signal power measurement. However, a desirable shape of output RE signal is known in advance, so that, by monitoring the signal power of output RF signal S140, it is possible to predict which of the IQ path difference delay and the phase offset in phase shifter 174 has a greater influence. That is, it is possible to predict that the influence of the I/Q path difference delay is large if the difference between the signal power of output RE signal S140 and the desirable output power is large, while it is possible to predict that the influence of the I/Q path difference delay is small if the difference between the signal power of output RF signal S140 and the desirable output power is small.

Therefore, by tuning variable delay section 220 if the difference between the signal power of output RF signal S140 and the desirable output power is equal to or higher than a predetermined threshold, and by tuning phase shifter 174 if the difference between the signal power of output RF signal S140 and the desirable output power is lower than a predetermined threshold, it is possible to alleviate the influence of I/Q path difference delay or phase offset in phase shifter 174 in a relatively short time.

Further, it is possible to tune variable delay section 220 if tuning needs to be performed in a relatively short time, and tune phase shifter 174 first if a relatively long time is given for tuning. As described above, variable delay section 220 is formed with multi-stage transistors and so on, and can produce relatively large delay compared to phase shifter 174. Therefore, by tuning variable delay section 220 if tuning needs to be performed in a relatively short time, it is possible to quickly decide whether the state of output RF signal S140 is subject to the influence of the I/Q path difference delay.

On the other hand, for example, phase shifter 174 has a variable capacitor of variable capacitance, and finely adjusts the amount of delay by adjusting the voltage applied to the capacitor. Therefore, by tuning phase shifter 174 when a relatively long time can be given for tuning, it is possible to adjust the phase offset between the carrier wave of I signal S125 and the carrier wave of Q signal S135 accurately, thereby making the power of tuned output RF signal S140 closer to the desired power.

When modulation indication signal S110 indicates QPSK modulation, modulation selecting section 110 activates QPSK data generating section 130 and deactivates OOK data generating section 120. Modulation selecting section 110 also commands filter property switching section 150 to switch the filter properties of pulse shaping sections 140-1 and 140-2 for QPSK data.

As in Embodiment 1, QPSK data generating section 130 outputs the I(t) signal and Q(t) signal represented by equations 22 and 23, based on four binary codes (00, 01, 10 and 11) or four symbols of a QPSK data signal.

Before phase control section 210 conducts a phase control of both variable delay section 220 and phase shifter 174, there is a possibility that both I/Q path difference delay and phase offset in phase shifter 174 are found in QPSK/OOK modulation apparatus 200. In this case, according to equations 28 and 29, output RF signal S140 of QPSK/OOK modulation apparatus 200 is represented by equation 39.

(Equation 39)

$$S(t) = I(t)\sin\omega t + Q(t)\cos\omega t \quad [39]$$
$$= \pm\cos(\phi - \delta_1)\sin(\omega t) \pm \sin(\phi)\sin(\omega t - \delta_2)$$

Here, $\delta_1$ is I/Q path difference delay, and $\delta_2$ is a phase offset to show how much the phase amount shifted in phase shifter 174 is offset from 90 degrees.

After acquiring the estimation values of both I/Q path difference delay and phase offset in phase shifter 174 using the above-described phase offset estimation method, phase control section 210 tunes variable delay section 220 and phase shifter 174 to eliminate a phase offset between an I signal and a Q signal. According to equation 39, tuned output RF signal S140 is represented by equation 31 as in Embodiment 1, and is in the form of a QPSK modulation wave.

It will be appreciated by a person skilled in the art that it is possible to use the above-noted maximum likelihood estimation method and offset estimation method based on signal amplitude measurement to estimate I/Q path difference delay and phase offset in phase shifter 174. However, output RF signal S140 of QPSK modulation apparatus 200 adopts different mathematical representation between OOK modulation and QPSK modulation, and, consequently, mathematical representation for estimation in these phase offset estimation methods, for example, equations 16 and 24, may be different between OOK modulation and QPSK modulation. Therefore, phase control section 210 may adequately adjust the phase offset estimation method in accordance with modulation indication signal S110.

Figure 6:
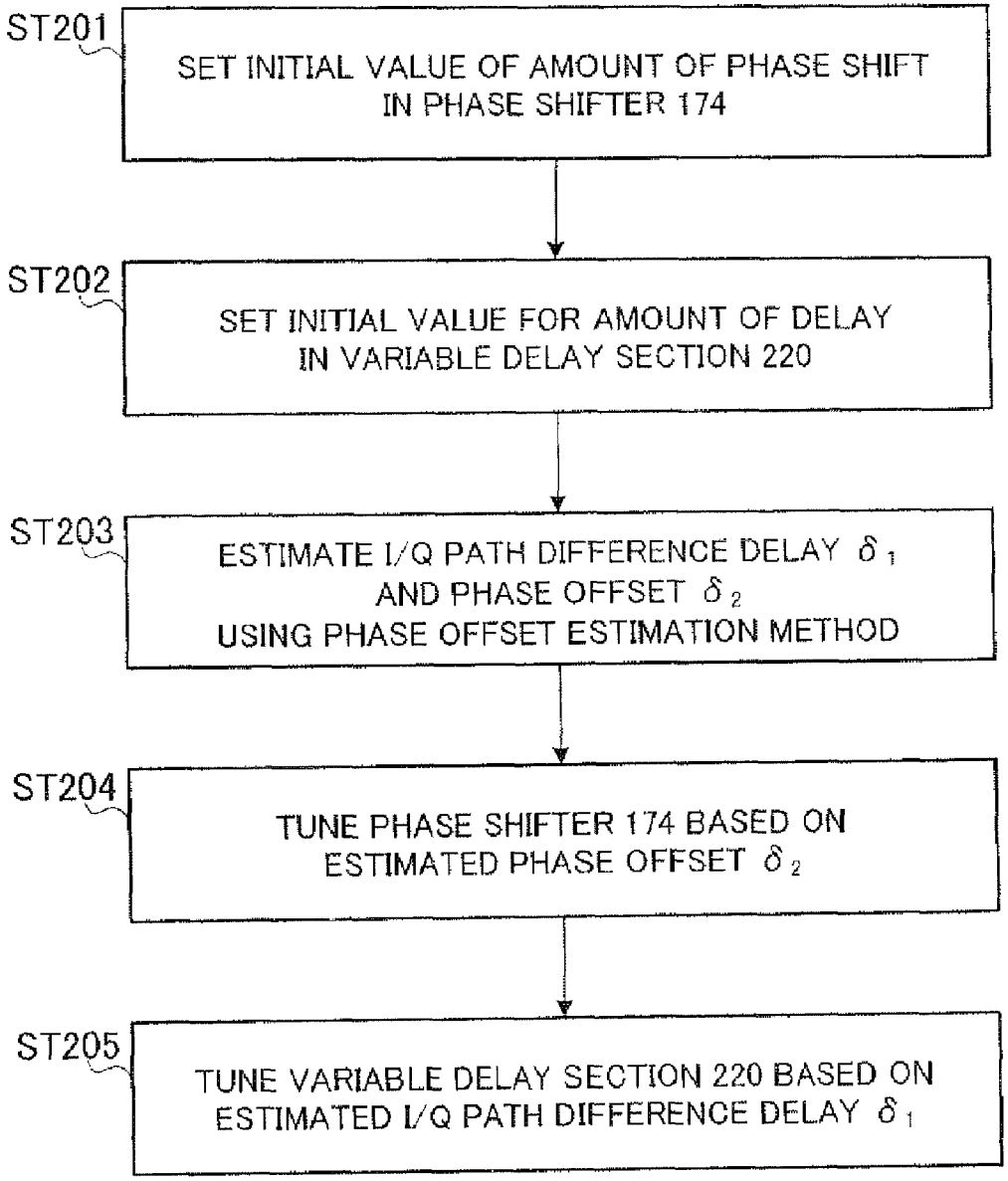
FIG. 6 is a flowchart illustrating a phase control method according to Embodiment 2.

FIG. 6 is a flowchart illustrating a phase control method according to the present embodiment. In the figure, "ST" represents each step in the flow.

In ST 201, the phase shift value of phase shifter 174 is set to an initial value. The initial phase shift value of phase shifter 174 is set to 90 degrees by adequately adjusting the capacitance of phase shifter 174. In ST 202, the delay value of variable delay section 220 is set to the initial value. The initial delay value of variable delay section 220 is set to zero by adequately adjusting the bias voltage of variable delay section 220. In ST 203, the I/Q path difference delay $\delta_1$ and the phase offset $\delta_2$ in phase shifter 174 are both estimated using the above-described phase offset estimation methods such as the estimation method based on signal amplitude measurement. In ST 204, phase shifter 174 is tuned according to the estimation value of the phase offset $\delta_2$ in phase shifter 174. This is implemented by readjusting the capacitance of phase shifter 174. In ST 205, variable delay section 220 is tuned according to the estimation value of the I/Q path difference delay $\delta_1$. This is implemented by readjusting the bias voltage of variable delay section 220.

As described above, the present embodiment estimates the I/Q path difference delay $\delta_1$ between the in-phase component and the quadrature component, based on output RF signal S140 and finely adjust the amount of delay in variable delay section 220 to eliminate the I/Q path difference delay $\delta_1$, so that it is possible to set the phase difference between the carrier wave of I signal S125 and the carrier wave of Q signal S135 to the target phase difference more reliably and combine these signals in summer 175, thereby alleviating the degradation of the amplitude level of output RF signal S140 reliably and reducing power loss reliably.

Embodiment 3

Figure 7:
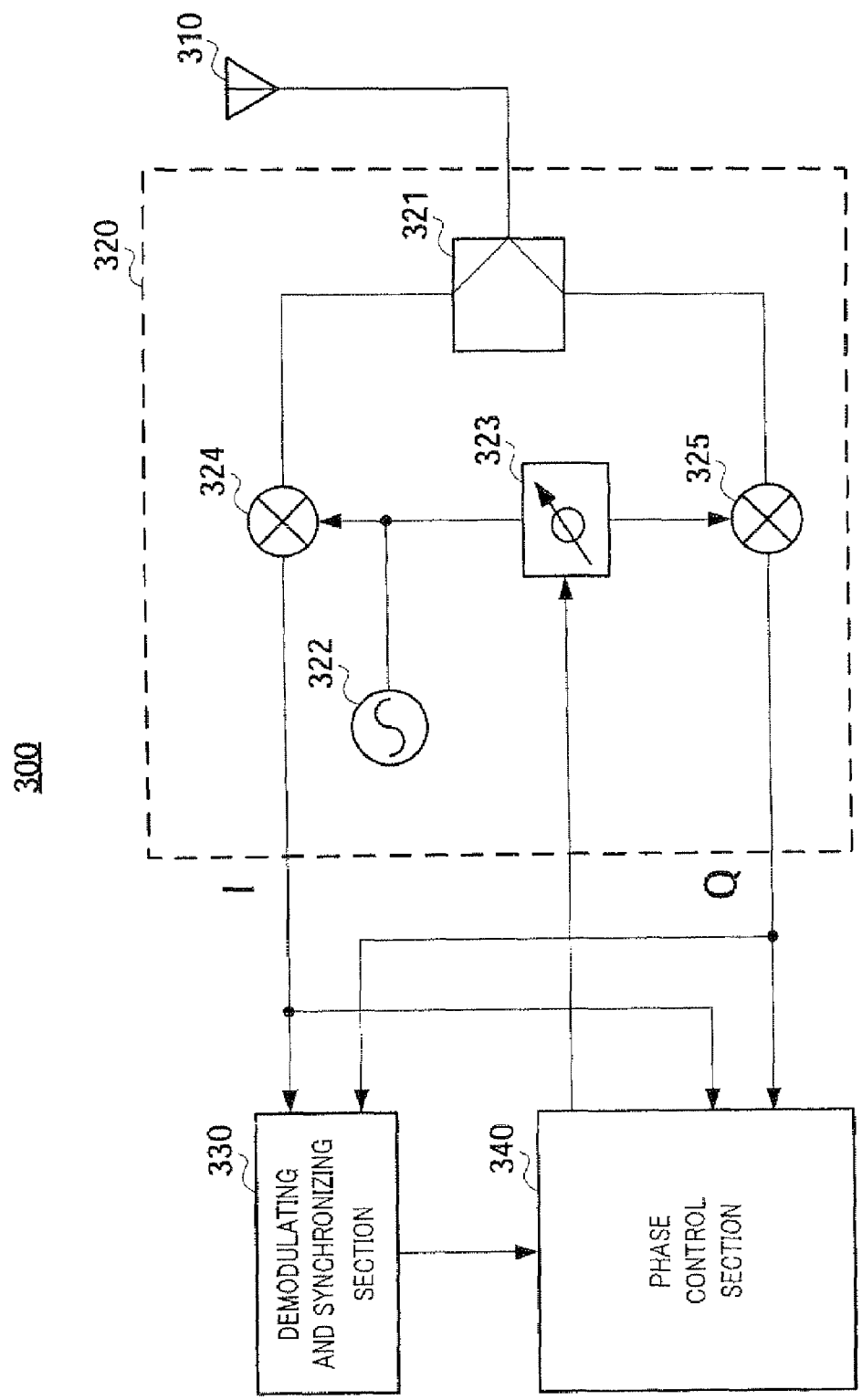
FIG. 7 is a block diagram showing the main components of a QPSK/OOK demodulation apparatus according to Embodiment 3 of the present invention.

FIG. 7 is a block diagram showing the main components of the QPSK/OOK demodulation apparatus according to Embodiment 3 of the present invention.

QPSK/OOK demodulation apparatus 300 in FIG. 7 is provided with receiving antenna 310, QPSK demodulating section 320, demodulating and synchronizing section 330, and phase control section 340. QPSK demodulating section 320 is provided with branch circuit 321, oscillator 322, phase shifter 323 and mixers 324 and 325.

Branch circuit 321 branches received signals via receiving antenna 310 and inputs these in mixers 324 and 325.

Based on the control signal outputted from phase control section 340, phase shifter 323 shifts the phase of a carrier wave outputted from oscillator 322 and outputs the shifted carrier wave to mixer 325.

Mixer 324 multiplies the carrier wave generated in oscillator 322 and the received signal, to down-convert the signal into a baseband I signal. Mixer 324 outputs the I signal to demodulating and synchronizing section 330 and phase control section 340.

Mixer 325 multiplies phase-shifted carrier wave outputted from phase shifter 323 and the received signal, to down-convert the signal into a baseband Q signal. Mixer 325 outputs the Q signal to demodulating and synchronizing section 330 and phase control section 340.

Thus, QPSK demodulating section 320 quadrature-demodulates received signals and converts them into the I signal and the Q signal.

Demodulating and synchronizing section 330 performs data demodulation using the I signal and the Q signal, and outputs the demodulated data to phase control section 340.

Phase control section 340 controls the amount of phase shift in phase shifter 323. Further, the method of controlling the amount of phase shift will be described later.

The operations of QPSK/OOK demodulation apparatus 300 of FIG. 7, which is formed as above, will be explained below.

Received signals, which are received via receiving antenna 310, are branched in branch circuit 321, and the branched received signals are outputted to mixers 324 and 325. A carrier wave outputted from oscillator 322 is adjusted to provide a predetermined phase in phase shifter 323 and outputted to mixer 325. Mixer 324 multiplies the carrier wave outputted from oscillator 322 and a received signal outputted from branch circuit 321, and converts the signal into a baseband I signal. Mixer 325 multiplies a phase-shifted carrier wave outputted from phase shifter 323 and a received signal outputted from branch circuit 321, and converts the signal into the baseband Q signal. Thus, QPSK demodulating section 320 quadrature-demodulates a received signal and converts it into an I signal and Q signal.

The I signal and the Q signal are outputted to demodulating and synchronizing section 330 to demodulate data.

If the orthogonality of the I signal and Q signal degrades upon quadrature demodulation in QPSK demodulating section 320, the degradation of demodulation performance is caused. As known from FIG. 7, QPSK demodulating section 320 performs signal processing using circuits of other systems after the branch circuit (e.g. mixers 324 and 325), and, consequently, it is difficult to keep the orthogonality of the I signal and Q signal accurately (e.g. the phase difference of 90 degrees).

To solve this, according to the present embodiment, phase control section 340 decides and adjusts the orthogonality of the I signal and Q signal based on the amplitude of an OOK signal received at receiving antenna 310. The method of controlling phase control section 340 will be explained below.

First, phase control section 340 adjusts the amount of shift in phase shifter 323 such that the phases of carrier waves provided from oscillator 322 to mixers 324 and 325 are not orthogonal (e.g. 90 degrees) but in-phase. By this means, the in-phase I signal and Q signal are acquired in mixers 324 and 325. These signals are outputted to phase control section 340.

Next, phase control section 340 calculates the amplitude difference between the in-phase I signal and Q signal, and compares the amplitude difference of I/Q signals upon receiving "1" as an OOK signal (i.e. the first amplitude difference), and the amplitude difference of I/Q signals upon receiving "0" as an OOK signal (i.e. the second amplitude difference). If the difference between the first amplitude difference and the second amplitude difference satisfies a predetermined value, phase control section 340 decides that the I signal sequence and the Q signal sequence meet predetermined orthogonality. By contrast, if the difference between the I signal and the Q signal does not satisfy a predetermined value, phase control section 340 changes and controls the amount of phase shift in phase shifter 323 to satisfy the orthogonality.

By this means, QPSK/OOK demodulation apparatus 300 can alleviate the degradation of the ON/OFF ratio upon receiving an OOK signal and output I/Q signals with good orthogonality upon receiving a QPSK signal, thereby alleviating the degradation of demodulation performance due to quadrature offset.

It will be appreciated by a person skilled in the art that numerous variations and/or modifications may be made to the present invention as shown in the embodiments without departing from the spirit or scope of the invention as broadly described. The present embodiments are therefore to be considered in all respects to be illustrative and not restrictive.

One aspect of the modulation apparatus of the present invention, which modulates a radio frequency signal subjected to amplitude modulation or phase modulation, employs a configuration having: a phase shifter that shifts a phase of a carrier wave; a generating section that generates an I signal and a Q signal according to an amplitude modulation mode or phase modulation mode; a multiplying section that generates a first mixed signal by multiplying the I signal and the carrier wave, and generates a second mixed signal by multiplying the Q signal and the carrier wave of the phase shifted in the phase shifter; a combining section that generates a radio frequency signal by adding the first mixed signal and the second mixed signal; and a phase control section that adjusts an amount of shift in the phase shifter based on the radio frequency signal of the amplitude modulation mode.

Another aspect of the modulation apparatus of the present invention employs a configuration in which the phase control section adjusts the amount of shift in the phase shifter in the amplitude modulation mode based on an amplitude difference between the first radio frequency signal and the second radio frequency signal modulated at different amplitude levels.

With these configuration, by generating an amplitude signal utilizing both branches of an I signal (in-phase component) and a Q signal (quadrature component), estimating the phase offset between the I signal carrier wave and the Q signal carrier wave based on the amplitude modulation signal, and tuning a phase shifter to eliminate the phase offset, it is possible to add the I signal and the Q signal by a desired phase offset, thereby suppressing the amplitude reduction caused by the phase offset and reducing power loss.

Another aspect of the modulation apparatus of the present invention, which modulates a radio frequency signal subjected to on-off-keying modulation or quadrature phase shift keying modulation, employs a configuration having: a signal generating section that generates an I signal and a Q signal according to a modulation scheme; a first baseband processing section that performs baseband processing of the I signal, and generates a first baseband signal; a second baseband processing section that performs baseband processing of the Q signal, and generates a second baseband signal; a local oscillator that generates a carrier wave; a phase shifter that shifts a phase of the carrier wave; a first mixer that generates a first mixed signal by multiplying the carrier wave generated in the local oscillator and the first baseband signal; a second mixer that generates a second mixed signal by multiplying the carrier wave of the phase shifted in the phase shifter and the second baseband signal; a combining section that generates a radio frequency signal by adding the first mixed signal and the second mixed signal; and a phase control section that estimates a phase offset between an actual phase difference of carrier waves of the first and second mixed signals and a target phase difference of the carrier waves of the first and second mixed signals, and controls an amount of shift in the phase shifter to eliminate the phase offset.

With this configuration, by generating an OOK modulation signal utilizing both branches of the I signal (in-phase component) and the Q signal (quadrature component), estimating the phase offset between the I signal carrier wave and the Q signal carrier wave based on the amplitude modulation signal, and tuning a phase shifter to eliminate the phase offset, it is possible to add the I signal and the Q signal by a desired phase offset, thereby alleviating the degradation of the ON/OFF ratio upon OOK modulation and correcting the I/Q quadrature offset upon QPSK modulation.

Another aspect of the present invention employs a configuration further having a variable delay section that gives a delay to the first baseband signal or the second baseband signal, and in which the phase control section further estimates a transmission path difference between a transmission path of the first baseband signal and a transmission path of the second baseband signal based on the radio frequency signal, and controls an amount of delay in the variable delay section to eliminate the transmission path difference.

With this configuration, the propagation path difference between an I signal (in-phase component) and a Q signal (quadrature component) can be eliminated, so that it is possible to add the I signal and the Q signal by a desired phase difference reliably, thereby suppressing the degradation of an amplitude level caused by the propagation path difference reliably and reducing power loss reliably.

Another aspect of the modulation apparatus of the present invention employs a configuration in which the phase control section tunes the phase offset by adjusting a capacitance of the phase shifter.

With this configuration, by changing the capacitance by controlling a voltage applied to a variable capacitor of a phase shifter, it is possible to finely adjust the phase of a carrier wave and adjust the phase difference between an I signal and a Q signal to a desirable phase difference.

Another aspect of the modulation apparatus of the present invention employs a configuration in which the phase control section comprises multi-stage transistors, and tunes the amount of delay by adjusting a bias voltage applied to the transistors.

With this configuration, by adjusting a bias voltage of transistors, it is possible to finely adjust the amount of delay and eliminate the propagation path difference between an I signal and a Q signal. Further, it is possible to change a variable range of the amount of delay in an easy manner by changing a combination of transistors or the number of stages of transistors.

Another aspect of the modulation apparatus of the present invention employs a configuration in which the phase control section tunes the phase offset using a method based on a maximum likelihood principle.

Another aspect of the modulation apparatus of the present invention employs a configuration in which the phase control section estimates the phase offset based on an amplitude of the radio frequency signal.

Another aspect of the modulation apparatus of the present invention employs a configuration in which the phase control section detects a power of the radio frequency signal and estimates the phase offset based on the power.

With these configurations, it is possible to estimate a phase offset between an actual phase difference of carrier waves of an I signal and Q signal and a target phase difference of carrier waves of the I signal and Q signal.

Another aspect of the modulation apparatus of the present invention employs a configuration in which the phase control section estimates the phase offset and the transmission path difference using a method based on a maximum likelihood principle.

Another aspect of the modulation apparatus of the present invention employs a configuration in which the phase control section estimates the phase offset and the transmission path difference based on an amplitude of the radio frequency signal.

With these configurations, it is possible to estimate a phase offset between an actual phase difference of carrier waves of an I signal and Q signal and a target phase difference of carrier waves of the I signal and Q signal, and estimate a propagation path difference between a propagation path of the I signal and a propagation path of the Q signal.

Another aspect of the modulation apparatus of the present invention employs a configuration in which the phase control section detects a power of the radio frequency signal, and controls the amount of delay in the variable delay section if a difference between the power and a target power is equal to or greater than a predetermined threshold, and controls the amount of delay in the phase shifter if the difference between the power and the target power is less than the threshold.

With this configuration, it is possible to adjust the amount of delay of an I signal or Q signal if an influence of the propagation path difference between the I signal and the Q signal is predicted to be large, and adjust the amount of phase shift of the Q signal carrier wave if the influence of a phase offset between carrier waves is predicted to be large, thereby eliminating the influence of the propagation path difference between the I signal and the Q signal, or the influence of the phase offset in a relatively short time.

An aspect of the demodulation apparatus of the present invention, which demodulates a radio frequency signal subjected to amplitude modulation or phase modulation, employs a configuration having: a phase shifter that shifts a phase of a carrier wave; a multiplying section that generates an I signal by multiplying the radio frequency signal by the carrier wave, and generates a Q signal by multiplying the radio frequency signal by the carrier wave of the phase shifted in the phase shifter; and a phase control section that controls an amount of shift in the phase shifter, wherein the phase control section adjusts the amount of shift in the phase shifter, based on an in-phase signal combining the I signal and the Q signal acquired by controlling the phase shifter such that the I signal and the Q signal of an amplitude modulation mode are in-phase.

Another aspect of the demodulation apparatus of the present invention employs a configuration in which the phase control section adjusts the amount of shift in the phase shifter in the amplitude modulation mode based on first in-phase signals and second in-phase signals of radio frequency signals modulated at different amplitude levels.

With these configuration, by demodulating an amplitude modulation signal utilizing both branches of an I signal (in-phase component) and a Q signal (quadrature component), estimating the phase offset between carrier waves of the I signal and the Q signal based on the amplitude modulation signal, and tuning a phase shifter to eliminate the phase offset, it is possible to output an I/Q signal with good orthogonality upon receiving a QPSK signal, thereby alleviating the degradation of demodulation performance due to quadrature offset.

The disclosures of Japanese Patent Application No. 2007-020159, filed on Jan. 30, 2002, and Japanese Patent Application No. 2008-019614, filed on Jan. 30, 2008, including the specifications, drawings and abstracts, are incorporated herein by reference in their entirety.

INDUSTRIAL APPLICABILITY

The modulation apparatus and demodulation apparatus of the present invention, which generate and demodulate a phase modulation signal and an amplitude modulation signal, can add an in-phase component and a quadrature component by a desired phase difference and reduce power loss, and are useful as a modulation apparatus and demodulation apparatus that generate QPSK modulation signals and OOK modulation signals and that are applied in, for example, millimeter bands.

The invention claimed is:
1. A modulation apparatus that modulates a radio frequency signal subjected to on-off-keying modulation or quadrature phase shift keying modulation, the modulation apparatus comprising:
   a signal generating section that generates an I signal and a Q signal according to a modulation scheme;
   a first baseband processing section that performs baseband processing of the I signal, and generates a first baseband signal;
   a second baseband processing section that performs baseband processing of the Q signal, and generates a second baseband signal;
   a local oscillator that generates a carrier wave;
   a phase shifter that shifts a phase of the carrier wave;
   a first mixer that generates a first mixed signal by multiplying the carrier wave generated in the local oscillator and the first baseband signal;
   a second mixer that generates a second mixed signal by multiplying the carrier wave having the phase shifted in the phase shifter and the second baseband signal;
   a combining section that generates a radio frequency signal by adding the first mixed signal and the second mixed signal; and
   a phase control section that estimates a phase offset between an actual phase difference of carrier waves of the first and second mixed signals and a target phase difference of the carrier waves of the first and second mixed signals, and controls an amount of shift in the phase shifter to eliminate the phase offset, wherein the modulation apparatus further comprises a variable delay section that delays the first baseband signal or the second baseband signal, wherein the phase control section further estimates a transmission path difference between a transmission path of the first baseband signal and a transmission path of the second baseband signal based on the radio frequency signal, and controls an amount of delay in the variable delay section to eliminate the transmission path difference.

2. The modulation apparatus according to claim 1, wherein the phase control section comprises multi-stage transistors, and tunes the amount of delay by adjusting a bias voltage applied to the multi-stage transistors.

3. The modulation apparatus according to claim 1, wherein the phase control section estimates the phase offset and the transmission path difference using a method based on a maximum likelihood principle.

4. The modulation apparatus according to claim 1, wherein the phase control section estimates the phase offset and the transmission path difference based on an amplitude of the radio frequency signal.

5. The modulation apparatus according to claim 1, wherein the phase control section detects a power of the radio frequency signal, and controls the amount of delay in the variable delay section if a difference between the power and a target power is equal to or greater than a predetermined threshold, and controls an amount of delay in the phase shifter if the difference between the power and the target power is less than the predetermined threshold.

* * * * *